March 6, 1973  F. M. SERRANO  3,719,374
SEALING CONSTRUCTION BETWEEN TWO JUXTAPOSED ELEMENTS
Filed March 5, 1970  2 Sheets-Sheet 1
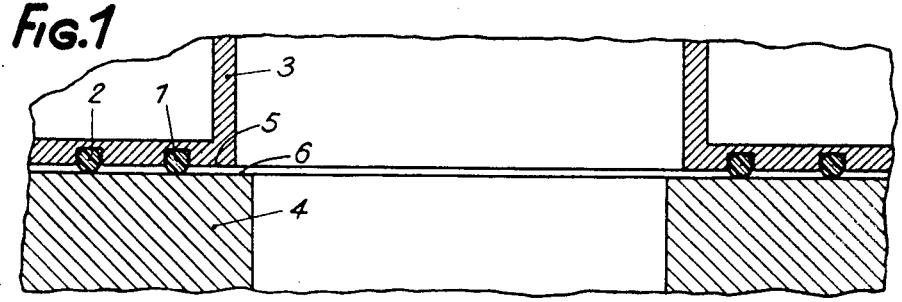
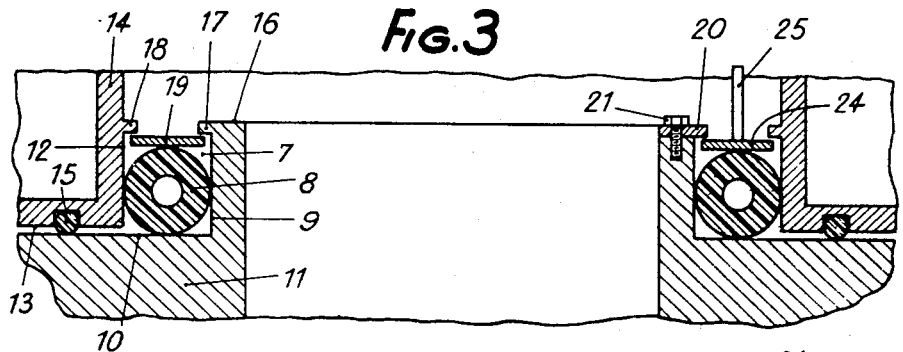
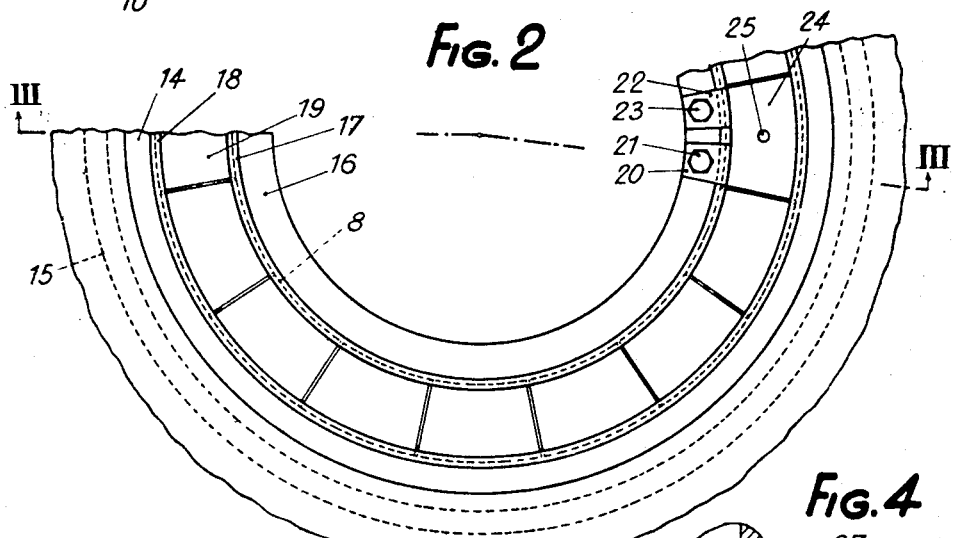
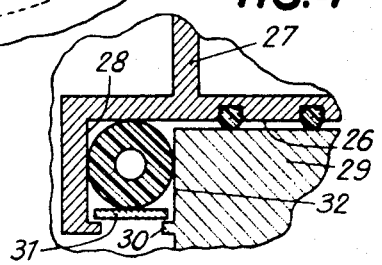

United States Patent Office 3,719,374
Patented Mar. 6, 1973

3,719,374
SEALING CONSTRUCTION BETWEEN TWO JUXTAPOSED ELEMENTS
Francisco M. Serrano, Paris, France, assignor to Compagnie Francaise des Petroles, Paris, France
Filed Mar. 5, 1970, Ser. No. 16,881
Claims priority, application France, Mar. 7, 1969, 6906361
Int. Cl. F16l *17/00*
U.S. Cl. 285—97
9 Claims

ABSTRACT OF THE DISCLOSURE

A sealing construction between two juxtaposed elements wherein the elements have support surfaces disposed in supporting relation to each other, and walls extending from the support surfaces and defining a chamber therebetween. A sealing member is inflated within the chamber to provide a liquid-tight joint between the elements.

BACKGROUND OF THE INVENTION

This invention relates to a sealing construction between two juxtaposed elements, and especially between two enclosures at atmospheric pressure, one of them being attached to the ocean bottom.

We know than an easy means for sealing two juxtaposed elements together is to make a grove in one of the parts that are in contact with each other and to introduce into it a toric rubber joint. Any fluid tending to penetrate between the two juxtaposed surfaces is stopped by the joint. The pressure to be used in applying the two elements against each other must be sufficient to stop a fluid tending to infiltrate between the two surfaces but must not however exceed a certain value so as not to crush the joint.

It may thus happen—either because of a lack of pressure in the application of the two elements against each other or, on the contrary, because of excess pressure, leading to the crushing of the joint—that an escape of fluid will occur. We thus frequently supplement the first toric joint with a second toric joint which we put in a groove parallel to the first.

However, this arrangement sometimes proves inadequate and, at any rate, it would not be suitable when the deterioration of and, consequently, the escape from the joint would bring about the infiltration of a liquid into an enclosure sheltering a user.

Such a case occurs especially when an enclosure, under atmospheric pressure, must be connected to an enclosure situated on the bottom of the sea.

SUMMARY OF THE INVENTION

The object of this invention consists in a sealing construction between two juxtaposed elements, each having a support surface, these surfaces being applied against each other, either directly or by means of joints, the sealing device being characterized by the addition of a chamber at least two of whose walls are formed by a prolongation of said surfaces that are in contact with each other, said chamber involving an inflatable joint that is applied against said walls.

The advantage of such a solution is that we can arrange a joint which we can apply upon the walls of the chamber at any predetermined pressure, said joint undergoing only the effect of said pressure and no longer being subject to the crushing resulting from the application of the support surfaces of the juxtaposed elements.

Another object of the invention is a sealing construction of this type, applicable to a closed enclosure made up of two detachable bodies, according to which each one of these bodies has a surface revealing a portion in the form of a crown and a portion prolonging said crown, the application of one of these surfaces against the other one, in the form of a crown, by virtue of the approach of the portions that prolong them, leading to the formation of a toric chamber inside which there is arranged an inflatable toric sealing member.

We thus have an easy means making it possible to render an enclosure perfectly tight, said enclosure consisting of two parts and submerged in a given environment, the chamber and inflatable sealing member being located, as the case may be, inside or outside the enclosure.

Another object of the invention is to facilitate the introduction or withdrawal of the toric sealing member into or from such a sealing construction by limiting one or both prolongations of the surfaces in the form of a crown so that their approach to each other will bring about the formation of a toric throat, the ends of the inside walls of said throat bearing edges and a series of small plates arranged between the inflatable sealing member and said edges closing off said groove so as to form a chamber.

It thus becomes possible, even in the case of a defect in the sealing, to reach the inflatable sealing member, either from the inside or from the outside of the enclosure, and to change it by a simple withdrawal and replacement of the small plates.

If, for example, we are dealing with an assembly consisting of a first inhabitable enclosure connected to a second enclosure placed on the ocean bottom, it suffices to provide the completed toric throat with small plates inside the assembly and to pump the water, which infiltrates in small quantity between the support surfaces during the operation of the exchange of the joint, an operation which may be very brief because of the structure provided for here.

Another object of the invention is a variant of the above device, facilitating access to the inflatable joint from the interior of an assembly made up of two juxtaposed enclosures by arranging small plates perpendicularly to the support surfaces and above the opening of the throat, said small plates being placed side by side so as to form a continuous wall and arching between each other due to the pressure exerted by the inflatable sealing member.

This variant thus permits the elimination of the inside edges on the walls of the toric throat, the withdrawal of the small plates being accomplished easily the moment the joint is deflated, the first small plate being removed by simply sliding it on the edges of the adjacent small plates.

The invention applies not only to the connection of submarine enclosures with a view to petroleum operations, for example, but to any device necessitating tightness without risk of crushing the joints used.

BRIEF DESCRIPTION OF THE DRAWING

FIG. 1 is a fragmentary elevational view in section of a conventional sealing construction for connecting two cylindrical elements;

FIG. 2 is a fragmentary plan view of a first embodiment of the sealing construction of this invention;

FIG. 3 is a fragmentary cross-sectional view taken along line III—III in FIG. 2;

FIG. 4 is a fragmentary elevational view in section of a modified form of the sealing construction shown in FIG. 2;

Figure 6:
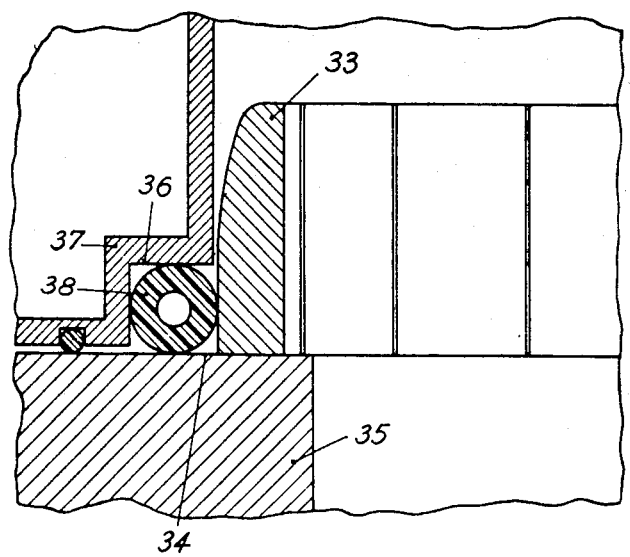
FIG. 6 is a fragmentary cross-sectional view taken along line VI—VI in FIG. 5.

To facilitate this disclosure, we shall asume that tightness or sealing must be guaranteed between two enclosures, one of them being placed on the ocean bottom. In fact, the invention applies to any junction of any two elements having at least two surfaces that are applied against each other along an entire given zone, where sealing between the surfaces in the zone must be effected.

In the example of the prior art shown in FIG. 1, toric joints 1 and 2 effect the sealing of enclosures 3 and 4 of which only one portion has been illustrated. This usual manner of joining and sealing entails the inconvenience of crushing these joints the moment the force of application of surface 5 of the first enclosure upon surface 6 exceeds a certain value. This occurs especially when enclosure 3 is juxtaposed to an enclosure 4 on the ocean bottom situated at a depth on the order of 50 meters, for example, and more.

In case of leakage between joints 1 and 2, one of the solutions is to pump the water infiltrating into the interior of the enclosures and to expel it toward the outside, which leads to a considerable power expenditure by virtue of the difference in the pressures between the inside and the outside environment, the moment the infiltration flow rate takes on a certain major proportion. Another solution is to close off the enclosures 3 and 4, to withdraw enclosure 3, to replace the joints and then to replace enclosure 3 on enclosure 4. These solutions, however are time-consuming, costly, and awkward especially at such depths.

According to the present invention, we improve upon the conventional sealing constructions by providing a chamber 7, as shown in FIG. 3, into which we introduce an inflatable sealing member 8. Chamber 7 is defined by an annular surface 9 extending vertically from the support surface 10 of the enclosure 11, and an annular surface 12 extending vertically from the support surface 13 of enclosure 14. In the example illustrated in FIG. 3, a conventional joint 15 assures a first sealing zone and may possibly be supplemented by a second parallel joint (not shown).

The upper edge 16 of enclosure 11 has an interior annular rim 17, and the internal wall 12 of enclosure 14 has an external rim 18 in alignment with the rim 17. The rims 17 and 18 serve as supports for a series of removable small plates 19, resting directly on inflatable sealing member 8.

Although we could provide small plates and rims whose dimensions should—when the inflatable joint is not placed under pressure—permit the introduction of said small plates inside the chamber by means of their simple inclination, it has proven to be worthwhile, for heavy pressures, to have rims that are closer together and to introduce the small plates 19 through a place at which at least one of the rims 17 or 18 is recessed.

By way of example, we have shown in FIG. 3 a stop 20 disposed in a recess in the rim 17 and removably mounted in place by a bolt 21. In FIG. 2, a second movable stop 22 is provided for the purpose of holding the small plate 24 in place. The movable stops 20 and 22 could furthermore pivot around the shafts of bolts 21 and 23, respectively. In order to facilitate the extraction of plate 24, it may be provided with an extension 25 or any other suitable means for enabling it to be gripped and removed.

If a leak is discovered, it is thus possible, by unscrewing bolts 21 and 23, to release plate 24 by withdrawing—or by causing to pivot—the stops 20 and 22. By deflating sealing member 8, it is possible to cause the other small plates 19 to slide up to the place where stops 20 and 22 have been raised or removed and to withdraw these plates. It suffices then to proceed to the withdrawal of the deteriorated sealing member and then to its replacement, which can be accomplished instantaneously. Prior to the reinflation of the joint, we reintroduce small plates 19, then small plate 24 which we attach by means of stops 20 and 22, and their attachment bolts 21 and 23.

It is noted that, during the inflation of joint 8, no pressure is exercised upon it, except for the reactions which it receives from the surrounding walls by virtue of inflation pressure. Furthermore, even in case of a relatively large water flow rate, coming from leakage between the surfaces 10 and 13, the pumping time necessary to evacuate the water while exchanging the sealing member is very short because of the speed of execution of the changing operation.

In the modified form of the invention shown in FIG. 4, we use a prolongation of the support surface 26 of enclosure 27 to form the bottom rim and the vertical wall 28 of the chamber containing the inflatable sealing member. The enclosure 29 is provided with an inside rim 30 in alignment with the bottom rim of the wall 28 to serve as supports for small plate 31.

It is clear that, if the device is used in the case where the enclosures are relatively accessible from the exterior and cannot be reached from the interior, the toric sealing chamber then surrounds the enclosures on the outside. In the case in FIG. 4, for example, surface 32 could represent the outside wall of the enclosure.

Numerous modifications could be introduced in the various elements described here without thus going beyond the framework of this invention. For example, chamfered rims could be placed in the vicinity of and parallel to the rims described earlier in order to serve as support and guidance for these small plates when the joint is deflated. The ends of the small plates could be overlapped so as to prevent any interstices therebetween.

Likewise, the chamber might not have to be toric and its cross-section might be of any suitable shape, the inflatable joint possibly being made up of a volume appropriate to the tightness zone delimited by the zone of contact of the two support surfaces of the elements to be connected. For example, the elements to be connected could be reduced to a sector of enclosures 11 and 14, possibly corresponding to a chamber limited to two small plates 19 and bordered laterally by conical surfaces against which the inflatable sealing member would be applied.

Figure 5:
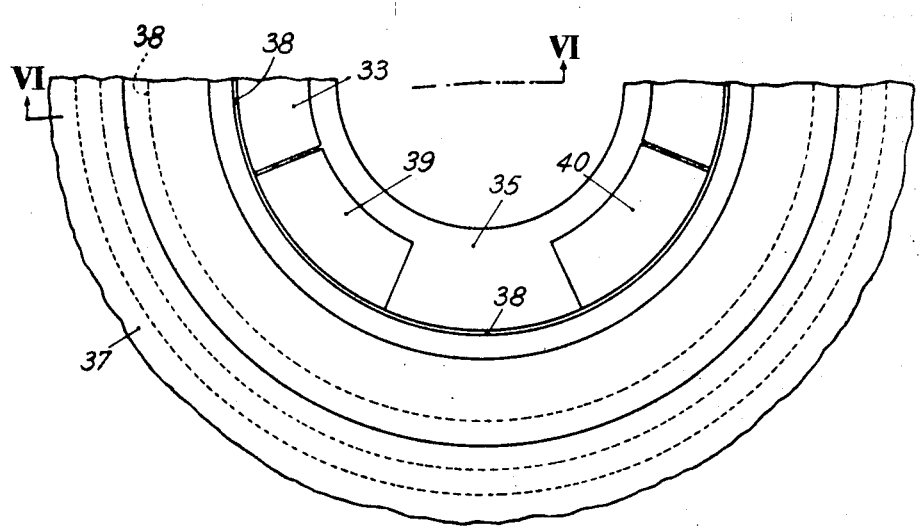
FIG. 5 is a fragmentary plan view of another modified form of the sealing construction shown in FIG. 2.

In the modified form of the invention shown in FIGS. 5 and 6, the small plates 33 are arranged vertically, side by side, and rest on the edge of surface 34 of enclosure 35, thus closing off the toric chamber defined by the surface 34 and the inside wall 36 of adjacent enclosure 37. During the mounting of the small plates 33 after insertion of inflatable joint 38, the last small plate (not shown) is inserted vertically between the two adjacent plates 39 and 40. When the sealing member 38 is inflated, the small plates 33, 38 and 39 are moved toward the center so that their lateral portions tightly engage each other to thereby retain the sealing member 38 in its chamber.

Although in the embodiment shown in FIGS. 5 and 6, the small plates 33 are arranged vertically and rest along their base on an edge of the surface 34, it is obvious that the small plates can be applied on the opening of a non-horizontal chamber, the small plates then taking on a certain inclination and being capable of being arranged even horizontally, their bases then no longer being capable of resting on the prolongation of one of the edges of the support surfaces.

What is claimed is:

1. In a sealing construction between two juxtaposed elements, each having a support surface, said surfaces being disposed in supporting relation to each other, the improvement comprising walls extending from said support surfaces and defining a chamber between said elements, an inflatable sealing member disposed within said chamber and being adapted to be inflated into sealing engagement with said walls, the ends of said walls terminating in inwardly extending, aligned rims which serve to further define said chamber, and a plurality of plates disposed between said rims and said sealing member to close said chamber.

2. The sealing construction of claim 1 wherein said elements are inhabitable enclosures, and wherein the bottom of said chamber is formed by the prolongation of the support surface of one of the enclosures, said walls of said chamber being constituted by annular surfaces extending substantially perpendicular to said support surfaces.

3. The sealing construction of claim 1 wherein one of said rims is provided with a recessed portion to facilitate removal of said plates therefrom, and stop means is releasably mounted on the wall for said one rim to prevent removal of said plates from said recessed portion.

4. The sealing construction of claim 3 wherein said stop means comprises a plate member extending into said recessed portion.

5. The sealing construction of claim 4 wherein said plate member is bolted to said one wall.

6. In a sealing construction between two juxtaposed substantially cylindrical enclosures, each having a support surface, said surfaces being disposed in supporting relation to each other, the improvement comprising walls extending from said support surfaces and defining a substantially annular chamber disposed on the inside of said enclosures, an inflatable sealing member disposed within said chamber and being adapted to be inflated into sealing engagement with said walls, and a plurality of curved plates disposed side by side over the interior of said chamber in substantially perpendicular relation to said support surfaces, whereby upon inflation of said sealing member, said plates are forced radially inwardly into tight engagement with each other 7. The sealing construction of claim 6 wherein the base of each of said plates rests on an inside prolongation of one of said support surfaces.

8. In a sealing construction between two detachable enclosures adapted for underwater use and exposure to high pressure, each enclosure having a support surface, said surfaces being disposed in supporting relation to each other, the improvement comprising walls extending from said support surfaces and defining with one of said support surfaces a substantially closed chamber, and an inflatable sealing member, having a substantially annular cross-section when inflated, disposed within said chamber and being adapted to be inflated into sealing engagement with said walls and said one support surface, wherein one of said walls extending from the other support surface comprises a first wall portion extending substantially perpendicularly to said one support surface and a second wall portion extending parallel to said one support surface, said first and second wall portions being in sealing engagement with said inflatable sealing member when inflated.

9. The sealing construction of claim 8 wherein the other of said walls extends from said one support surface in substantially parallel relation to said first wall portion.

References Cited

UNITED STATES PATENTS

| | | | |
|---|---|---|---|
| 794,987 | 7/1905 | Kneuper | 277—34 |
| 2,785,824 | 3/1957 | Reeves | 277—34 X |
| 2,495,871 | 1/1950 | Stewart | 277—11 |
| 2,145,645 | 1/1939 | Byers | 285—349 X |
| 1,714,803 | 5/1929 | Mueller | 285—349 X |
| 2,230,725 | 2/1941 | Nathan | 285—349 X |

FOREIGN PATENTS

| | | | |
|---|---|---|---|
| 868,188 | 9/1941 | France | 285—349 |

ANDREW V. KUNDRAT, Primary Examiner

U.S. Cl. X.R.

277—34.3